Figure 1:
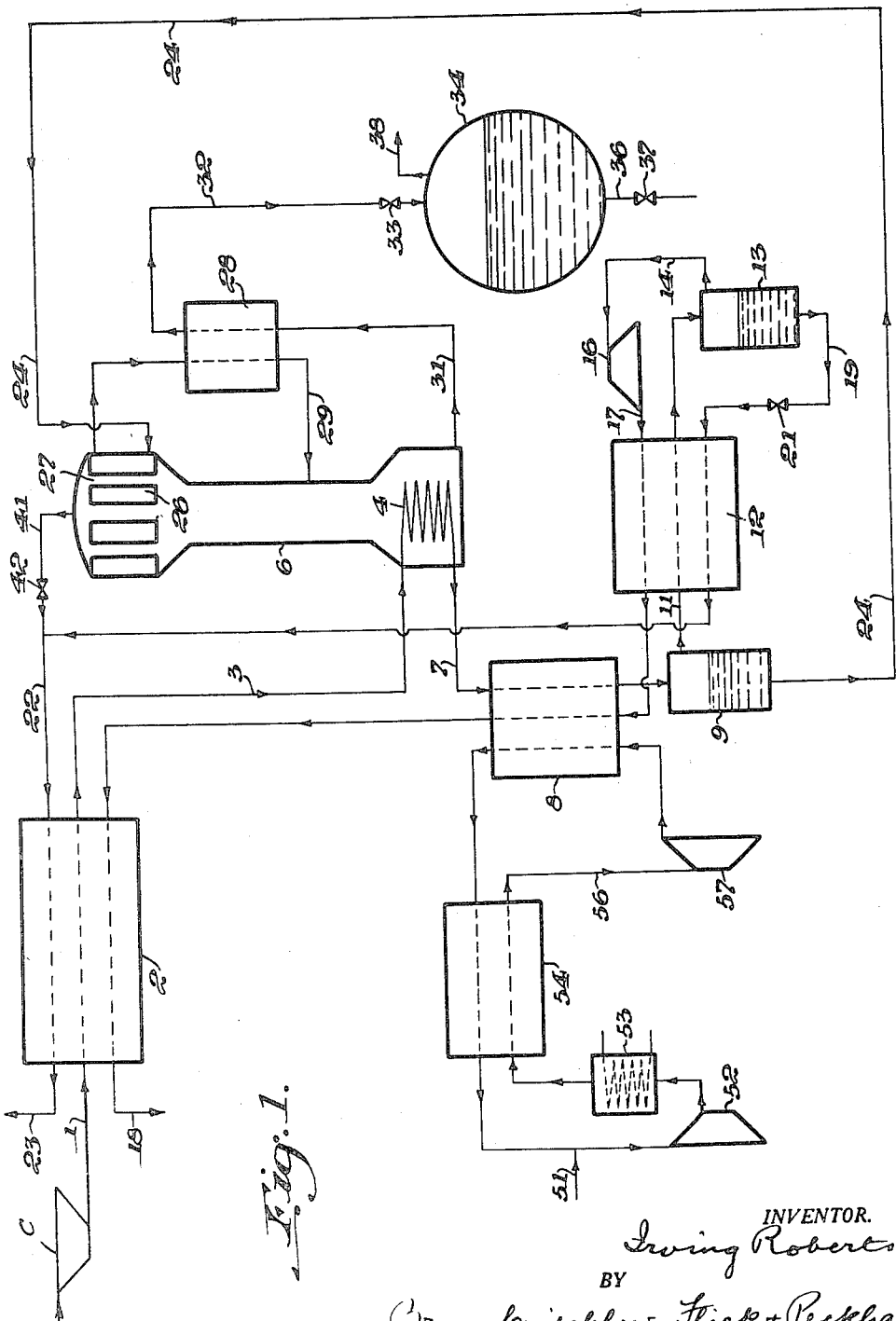

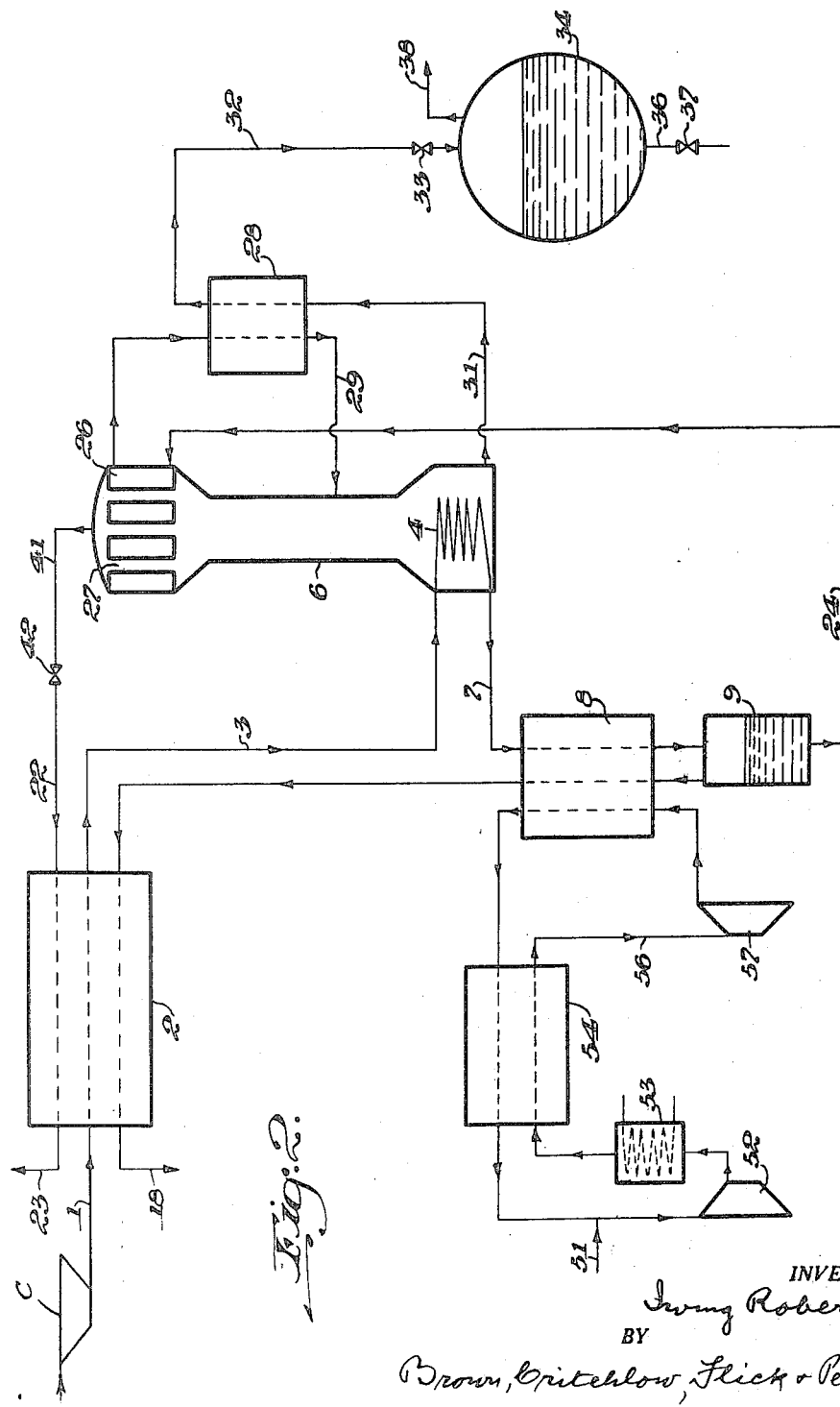

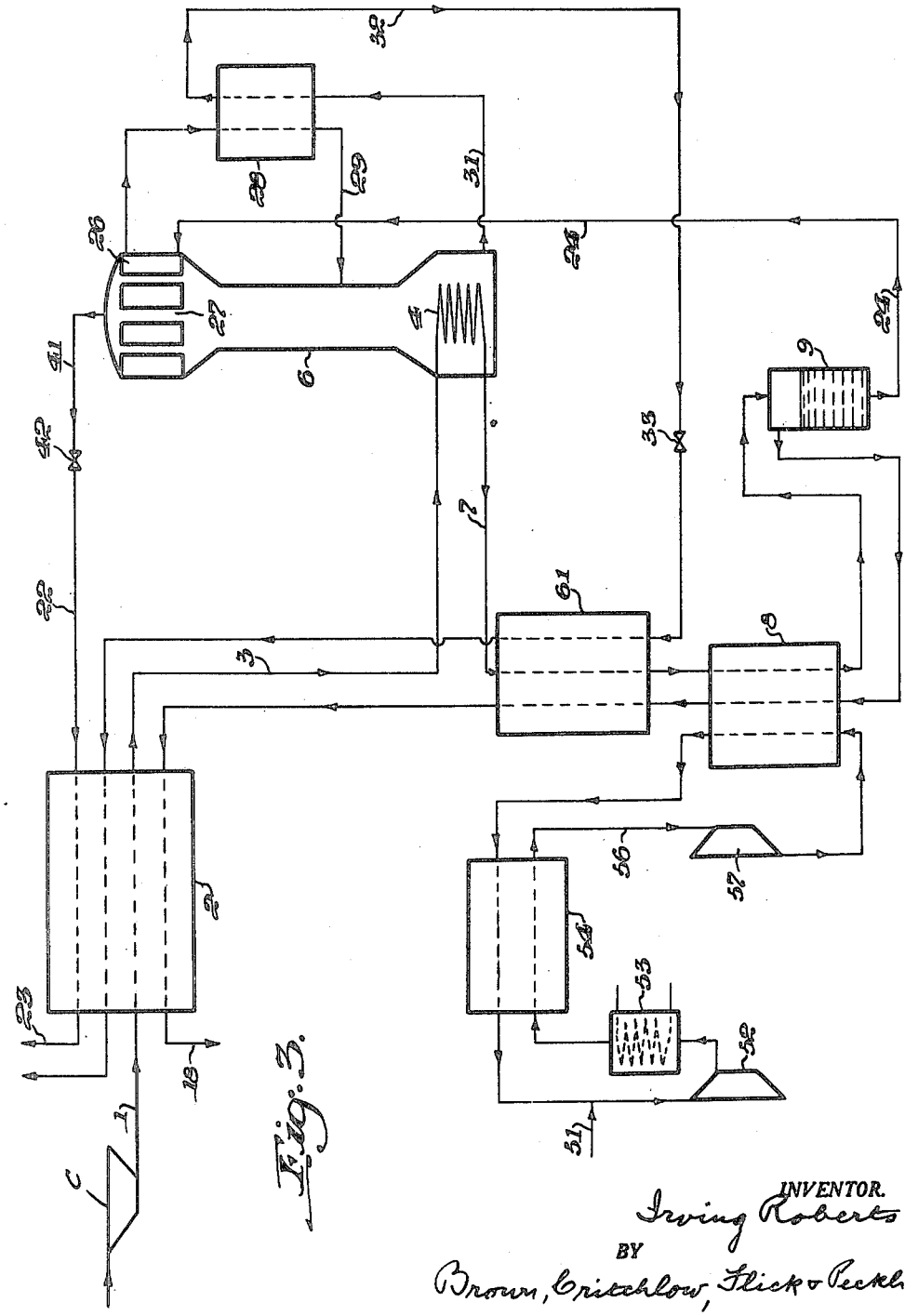

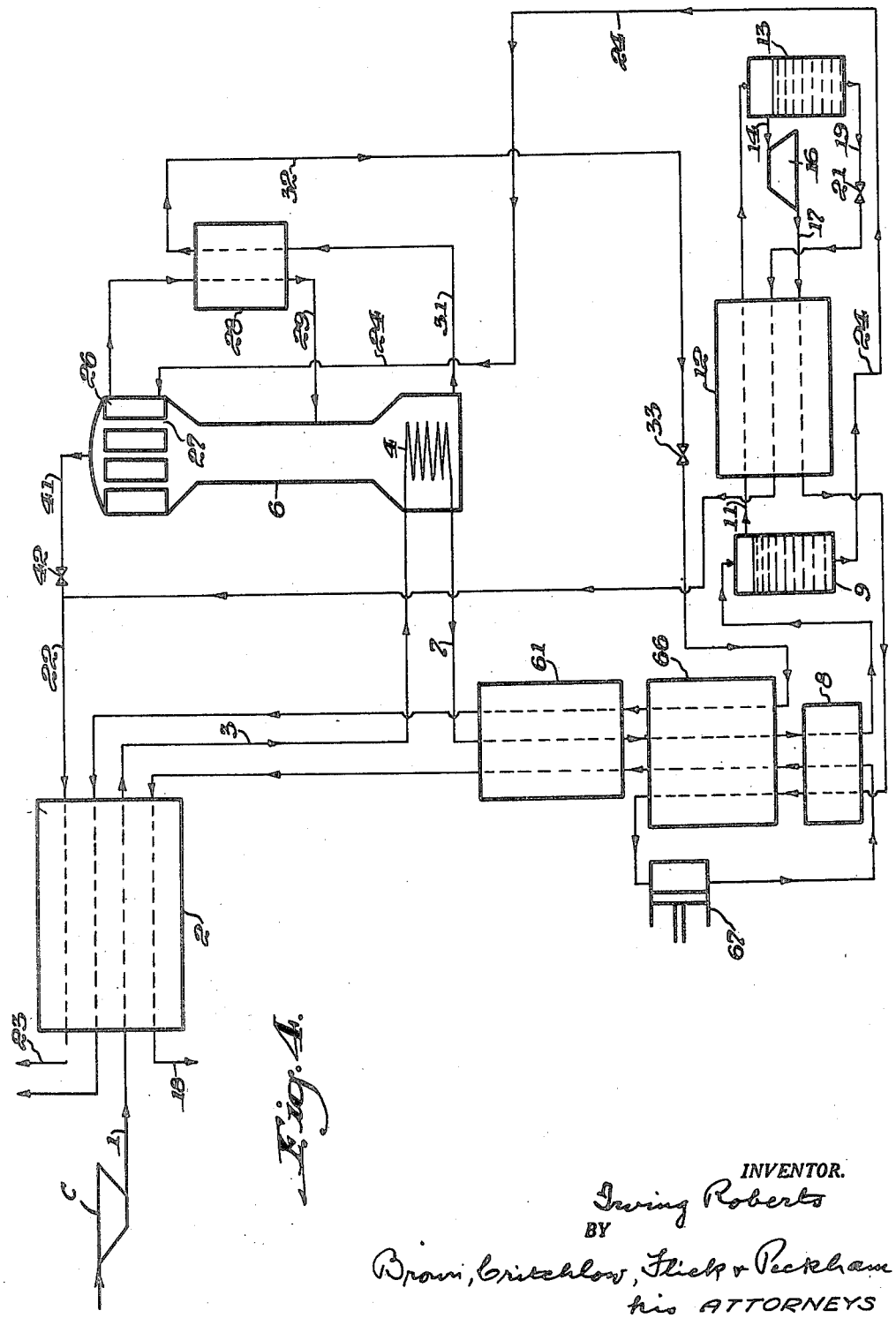

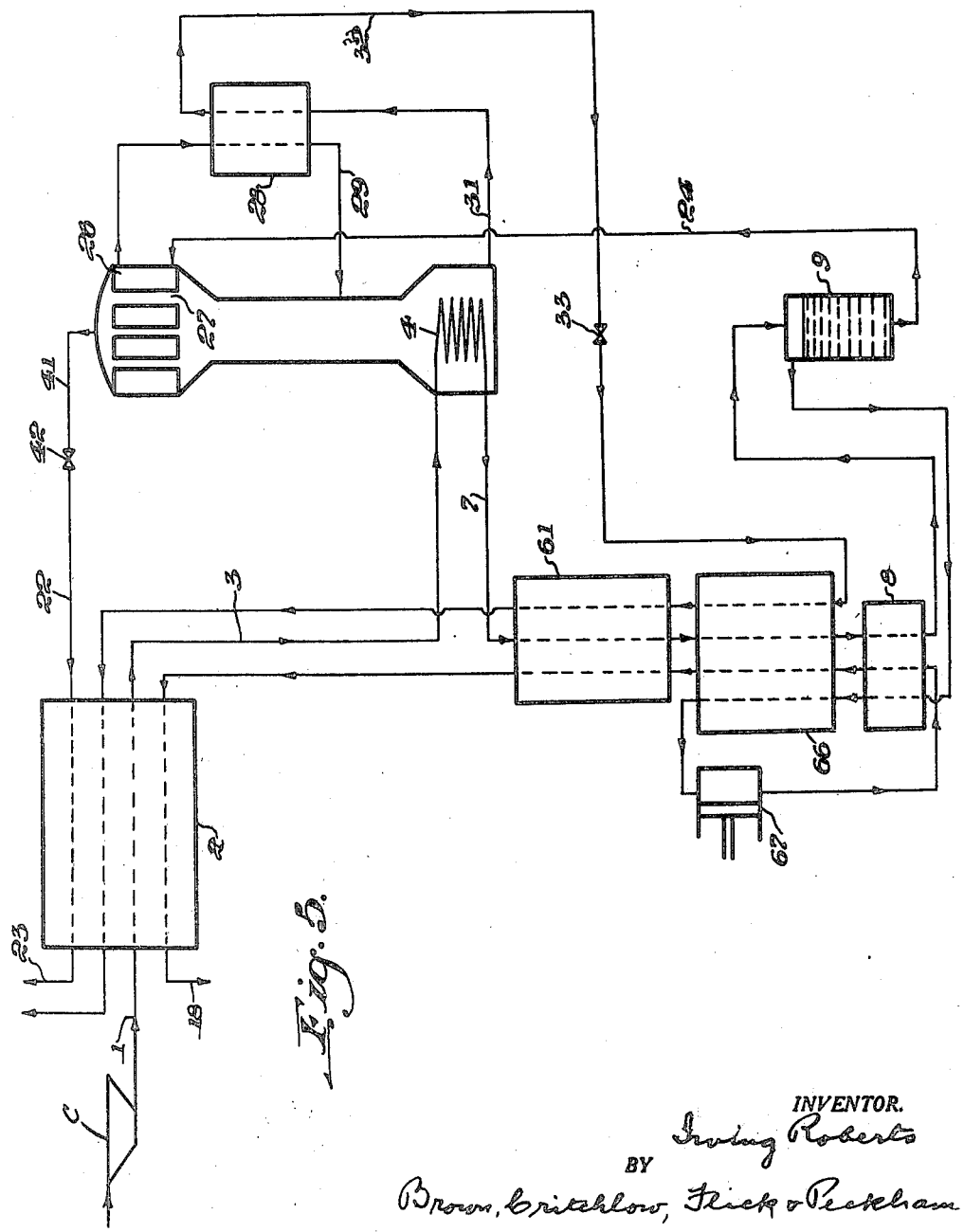

Patented Jan. 24, 1950

2,495,549

UNITED STATES PATENT OFFICE 2,495,549

SEPARATION OF TERNARY GASEOUS MIXTURES CONTAINING HYDROGEN AND METHANE

Irving Roberts, Jeannette, Pa., assignor to Elliott Company, Jeannette, Pa., a corporation of Pennsylvania Application March 15, 1949, Serial No. 81,442

15 Claims. (Cl. 62—175.5)

This invention relates to the separation of substantially ternary gaseous mixtures containing hydrogen and methane by partial condensation and rectification and, more particularly, to the separation of coke oven gas and like gases to recover hydrogen and methane therefrom.

Coke oven gas contains at least six constituents with concentrations over 1 per cent, the principal ones in a typical gas being hydrogen (50 per cent), methane (30 per cent), and nitrogen and carbon monoxide (together about 15 per cent). Heretofore, the main purpose in coke oven gas separation has been to obtain as pure hydrogen as possible, the methane being recovered merely as a by-product adulterated with the nitrogen and carbon monoxide of the original gas. Now, however, with the increased demand for methane as a fuel and the resulting strain on distribution systems to supply that demand, it is frequently desirable to recover methane in as pure a state as is economically possible. Methane of substantial purity (99 per cent) can be more economically distributed and stored, since space is not taken up by inert or undesirable impurities. This is particularly true where the methane is to be stored as a liquid in insulated tanks as a fuel reserve against periods of peak demand; if the methane is not pure, not only is valuable storage space occupied by impurities, but also considerable power is wasted in liquefying the gas. It is also desirable that the separation process be adapted to produce either liquid or gaseous methane as may be required by the particular distribution and storage system.

The problem of separating coke oven gas and like gases to obtain both hydrogen and pure methane differs very considerably from that of separating a binary mixture of those two substances. Whereas, the boiling points of hydrogen and methane are sufficiently far apart to permit them to be separated by partial condensation alone, when there is also present in the gas to be separated substantial amounts of nitrogen and carbon monoxide (as there is in coke oven gas), the methane cannot be recovered in a substantially pure state by this means. Since the boiling points of nitrogen and carbon monoxide are very close together and are between those of hydrogen and methane, coke oven gas may be considered as a substantially ternary mixture, in which the hydrogen can be in the gaseous state while all the other constituents are liquid. To obtain pure methane, this liquid must be further separated by rectification.

Since many important applications of hydrogen involve its use under pressure, for example, in various hydrogenation processes and in ammonia synthesis, it is frequently advantageous to recover the hydrogen at as high a pressure as possible. And for many of these applications, the hydrogen need not have a purity greater than 92 per cent.

It is accordingly among the objects of this invention to provide a method and apparatus for separating the constituents of coke oven gas, or other substantially ternary gaseous mixtures containing hydrogen and methane plus a substance having an intermediate boiling point, by which the hydrogen may be recovered with a purity of 92 per cent or higher and in which substantially pure methane may be recovered either as a liquid or as a gas.

Another object is to provide such a method and apparatus in which the hydrogen may be recovered under substantial pressure.

In accordance with this invention, the coke oven gas or other substantially ternary mixture containing hydrogen and methane is first compressed and then initially cooled by heat exchange with the cold separated gaseous products. It is further cooled by heat exchange with liquid methane in a rectifying column, so as to vaporize some of that liquid to form vapor reflux for the subsequent rectification of a portion of the mixture. The incoming mixture is then still further cooled and partially liquefied by heat exchange with some of the cold gaseous products of the separation and, additionally, if it is desired to recover the hydrogen at a substantial pressure, with a cold fluid in an external refrigeration cycle. The portion of the mixture that is not liquefied (consisting largely of hydrogen) is used to cool the incoming mixture as already described; or, if it is desired to increase the purity of the hydrogen, it may first be further cooled by expansion to a slightly lower pressure to condense therefrom substantially all of its less volatile constituents.

The liquefied portion of the mixture (containing most of the methane, nitrogen, and carbon monoxide present in the original gas) is warmed and partially vaporized in the rectifying column to condense liquid reflux for use therein. It is further warmed and vaporized by heat exchange with liquid methane withdrawn from the column to subcool the liquid, after which it is rectified in the column to produce liquid methane and a cold gas containing most of the nitrogen and carbon monoxide present in the original mixture. This cold gas is used to effect part of the initial cooling of the entering mixture.

The liquid methane resulting from the rectification, after being subcooled as above described, is throttled to substantially atmospheric pressure and either stored as a liquid in an insulated tank or, if it is desired to recover this product in the vapor state, vaporized and warmed in cooling the incoming mixture.

The invention is diagrammatically illustrated in the accompanying drawings, in which Fig. 1 is an arrangement for producing liquid methane of about 99 per cent purity and gaseous hydrogen under pressure of about 97 per cent purity; Fig. 2 is a modification of Fig. 1, in which hydrogen of about 92 per cent purity and at a higher pressure is obtained; Fig. 3 is a modification of Fig. 2, in which the methane is recovered as a gas rather than as a liquid; and Figs. 4 and 5 are modifications of Fig. 3, in which no external refrigeration cycle is used and the hydrogen is recovered at low pressure with a purity of about 97 and 92 per cent, respectively. While the invention is herein described with reference to the separation of coke oven gas, it is to be understood that it is equally applicable to the separation of other substantially ternary gaseous mixtures containing hydrogen and methane and a third compound having an intermediate boiling point.

Referring to Fig. 1, coke oven gas, which has been compressed to a pressure of around 155 pounds per square inch absolute in a compressor C and from which the heat of compression, the carbon dioxide, hydrogen sulphide, and water vapor have preferably been removed by means that are well known in the art, is introduced through a pipe 1 to a countercurrent heat exchanger 2, where it is cooled to a temperature of about −119° F. by the cold gaseous products of the separation. The initially cooled gaseous mixture leaves exchanger 2 by a pipe 3, in which may be placed a trap (not shown on the drawing) for removing a liquefied fraction containing ethylene and other higher boiling constituents of the original mixture that are liquefied at the temperature and pressure prevailing at the cold end of the exchanger. The mixture, freed of these constituents, is then further cooled in a reboiler 4 at the bottom of a rectifying column 6 by heat exchange with liquid methane at a temperature around −190° F. in the bottom of the column obtained from the rectification of a portion of the mixture, as hereinafter described. The temperature of the mixture is thereby lowered to about −180° F.; and it is withdrawn from the reboiler by a pipe 7, in which may be placed a trap, similar to that mentioned in connection with pipe 3, for removing another liquid fraction containing substantially all of the remaining ethylene and other higher boiling constituents of the mixture, plus a small amount of liquefied methane. The mixture is conducted by pipe 7 to a liquefier 8, where it is still further cooled to a temperature of about −300° F. by cold gaseous hydrogen separated in the process and a cold fluid circulated, as hereinafter described, in an external refrigeration cycle. In passing through the liquefier substantially all of the remaining constituents of the original mixture, with the exception of hydrogen, are liquefied. This liquid is collected in a receiver 9.

The unliquefied portion of the mixture leaving the cold end of liquefier 8, together with any gas vaporized from the liquid in receiver 9, is led by a pipe 11 to a second liquefier 12, where it is further cooled to a temperature of about −330° F. At the temperature and pressure prevailing at the cold end of liquefier 12, most of the residual constituents of the mixture with higher boiling points than hydrogen are liquefied and collected in a receiver 13. The still unliquefied portion of the gas, together with any gas vaporized from the liquid in receiver 13, are substantially pure (97 per cent) hydrogen and are led by a pipe 14 to an expansion means, such as an expansion turbine 16, and there expanded with performance of external work to an intermediate pressure of about 114 pounds per square inch absolute, thereby cooling the hydrogen to about −338° F., which is the coldest temperature in the system. While the temperature at this point could be lowered still further by expanding the hydrogen to a lower pressure, the drop in temperature is limited to about 8° F., the amount required to produce a proper temperature difference at the cold end of liquefier 12. Since the traces of carbon monoxide and nitrogen remaining in the gas would solidify at a temperature of around −335° F., a lower temperature at this point might plug the apparatus.

The expanded hydrogen leaving expansion turbine 16 is conducted by a pipe 17 to the cold end of liquefier 12, where it cools the impure hydrogen introduced through pipe 11, as previously described. The cold pure hydrogen is then led successively through liquefier 8 and exchanger 2, in each of which it helps to cool the incoming mixture. The hydrogen is discharged at the warm end of exchanger 2 through a pipe 18 at a pressure of about 110 pounds per square inch absolute. It can then be used directly in hydrogenation processes or in ammonia synthesis, or it may be further compressed and stored in cylinders.

The liquid in receiver 13 consisting mostly of nitrogen and carbon monoxide is withdrawn through a pipe 19 and expanded in a throttle valve 21 to substantially atmospheric pressure, thereby lowering its temperature to around −332° F. and causing some of the liquid to flash into vapor. The expanded mixture of liquid and vapor passes through liquefier 12, where it augments the cooling effect of the expanded hydrogen passing through the same apparatus. It is then led by a pipe 22 to the cold end of exchanger 2, where it helps to cool the incoming mixture, and is discharged into the atmosphere as a waste gas at the warm end of that exchanger through a pipe 23.

The liquid in receiver 9, consisting largely of methane (sixty-nine per cent) together with most of the nitrogen and carbon monoxide in the original mixture, is conducted by a pipe 24 to a condenser 26 in the top of column 6. The liquid is there warmed from about −300° F. to −275° F. and partially vaporized in condensing as liquid reflux some of the gaseous effluents of rectification passing through tubes 27 of the condenser. It is then further warmed and vaporized in subcooling liquid methane in exchanger 28, after which it is introduced, still largely in the liquid state, through a pipe 29 to an intermediate point of the rectifying column at a pressure of about 150 pounds per square inch and at a temperature of about −226° F. It is there rectified into substantially pure (99 per cent) methane and a mixture of nitrogen and carbon monoxide, with some hydrogen.

The methane collects as a liquid at the bottom of the column around the reboiler 4. This liquid absorbs heat from the initially cooled mixture within the reboiler, as previously described, causing some of the liquid to vaporize and form the vapor reflux required for rectification. Since the products that are being separated in the column are methane on the one hand and nitrogen and carbon monoxide on the other, and since the boiling point of the one is considerably higher than those of the other two, only a small amount of reflux is needed for their adequate rectification. Accordingly, to form the vapor reflux only a small amount of liquid methane needs to be vaporized, and but little heat is required for this purpose. That heat is conveniently supplied by the sensible heat of the entering mixture, which is thereby cooled but not liquefied (except for a small amount of higher boiling constituents). In the usual rectification process, liquid reflux is condensed in the reboiler 4 by heat exchange with the rectified liquid in the bottom of the column. In the present invention, liquid reflux is obtained by condensing a mixture of nitrogen and carbon monoxide at the top of the column by heat exchange with a liquefied fraction of the mixture in condenser 26.

Liquid methane is withdrawn from the bottom of the column through a pipe 31 and is subcooled in exchanger 28, as previously described, to a temperature of about —260° F. to reduce the amount of flashing that would otherwise occur upon its subsequent expansion in a throttle valve 33 to substantially atmospheric pressure. The expanded liquid methane is then delivered by a pipe 32 to a suitably insulated storage tank 34. The tank is provided with a liquid outlet 36, controlled by valve 37, for delivery of liquid methane to heat exchangers, where it is vaporized, warmed, and led to distribution mains during periods of peak demand for fuel. The tank is also provided with a vent pipe 38, through which can escape the methane gas evaporated from the liquid in the tank by inleakage of heat from the outside.

The gas issuing from the top of the column through pipe 41 consists largely of nitrogen and carbon monoxide, with some hydrogen. It is throttled to substantially atmospheric pressure in valve 42 and then led to pipe 22, where it augments the supply of cold waste gases therein used to cool the incoming mixture in exchanger 2.

As previously stated, liquefier 8 is in part cooled by a cold fluid circulated in an external refrigeration cycle. This fluid is preferably nitrogen, or a mixture of nitrogen and carbon monoxide, such as could be obtained from the gaseous products of rectification herein. The fluid is admitted to this external cycle through a pipe 51 from any convenient source (since the cycle is a closed one, there would normally be admitted through pipe 51 only enough fluid to compensate for possible leakage) and is compressed to a relatively high pressure in a compressor 52. The heat of compression is removed in an aftercooler 53. and the warm compressed fluid is then cooled in a heat exchanger 54 and led by a pipe 56 to an expansion means, such as an expansion engine 57, where it is expanded with performance of external work to substantially atmospheric pressure to cool it to about —303° F. This cold expanded fluid is passed through liquefier 8 in a countercurrent direction to the incoming mixture to help cool and partially liquefy the mixture, as previously described. The fluid is thereby partially warmed and is led back to exchanger 54 to cool the compressed fluid and recycled. The preference for nitrogen, or nitrogen and carbon monoxide, as the refrigerating fluid is based on the possibility of leakage between the gas passages in liquefier 8 and the desirability of using a refrigerant that will not under such circumstances react violently with the hydrogen in one of those passages.

In the apparatus just described, the hydrogen that is recovered in pipe 18 at the warm end of exchanger 2 has a purity of 97 per cent or higher and is at a pressure of around 110 pounds per square inch absolute. If it is desired to obtain hydrogen of a lower purity, around 92 per cent, and at a higher pressure, about 145 pounds per square inch absolute, the apparatus may be modified as shown in Fig. 2, in which the unliquefied portion of the coke oven gas leaving the cold end of liquefier 8 (plus that evaporating from the liquid in receiver 9) is not further purified, but is led back directly through liquefier 8 and exchanger 2 as a cooling agent therein.

In some cases, it is desirable to recover the methane as a gas for immediate distribution into the fuel lines of the community, rather than storing it as a liquid for future use. Apparatus for accomplishing this result is shown in Fig. 3, in which the hydrogen is recovered with a purity of 92 per cent at a pressure of about 145 pounds per square inch absolute. This embodiment of the invention is accordingly similar to that shown in Fig. 2, except for the addition of another heat exchanger 61. through which the entering mixture in pipe 1 is led before it is introduced into liquefier 8. This exchanger is cooled, as shown on the drawing, by cold gaseous methane expanded in throttle valve 33 to substantially atmospheric pressure and by the cold hydrogen leaving the warm end of liquefier 8. The partially warmed methane and hydrogen leaving the warm end of exchanger 61 are both used, along with the waste gases of rectification from pipe 22, to cool the entering mixture in exchanger 2.

In the arrangement shown in Fig. 3, and in the subsequent modifications of it to be discussed below, it is still desirable to subcool in exchanger 28 the liquid methane withdrawn from the column to reduce its flashing upon subsequent expansion in throttle valve 33. Considerably more flashing would result if the liquid methane were throttled at the temperature (—190° F.) at which it leaves the bottom of the rectifying column and, to the extent that it did occur, the latent heat of vaporization of the liquid would not be available for cooling the entering mixture.

In the modifications of the invention so far described, the hydrogen has been recovered either at substantially the same pressure as that to which the original mixture was compressed (in the use of hydrogen having a purity of 92 per cent), or at a slightly lower pressure (in the case of hydrogen having a purity of 97 per cent). If desired, the hydrogen can be expanded to substantially atmospheric or slightly higher pressure to supply additional refrigeration, making it possible to eliminate the external refrigeration cycle when the methane is recovered as a gas (if the methane is recovered as a liquid, some external refrigeration will still be required). Modifications of the arrangement shown in Fig. 3 to accomplish this result are illustrated in Figs. 4 and 5, for obtaining pure and impure hydrogen, respectively.

Referring to Fig. 4, the compressed mixture is cooled in exchanger 2, reboiler 4, and exchanger 61, as previously described in connection with Fig. 3, and then passed through an additional exchanger 66 before it is introduced into liquefier 8. The uncondensed portion of the mixture leaving liquefier 8 is further cooled and partially liquefied to obtain hydrogen of greater purity in the same auxiliary cycle that has been described in connection with Fig. 1. The partially expanded hydrogen leaving the warm end of liquefier 12 is passed back through liquefier 8 and exchanger 66 as a cooling agent therein and then expanded from a pressure of about 112 pounds per square inch absolute to substantially atmospheric pressure with performance of external work in an expansion engine 67. The partially warmed hydrogen is thereby recovered to about −308° F. and passed successively through liquefier 8 and exchangers 66, 61, and 2 as a cooling agent therein. The subcooled liquid methane throttled in valve 33 is also used as a cooling agent in those three exchangers; and additionally in the last exchanger, there is a third cooling agent as before, consisting of the cold waste gases from pipe 22.

Hydrogen of 92 per cent purity and at a pressure somewhat above atmospheric is recovered along with gaseous methane in the arrangement shown in Fig. 5. Here the apparatus is the same as that in Fig. 4, except for the elimination of the hydrogen purification cycle. The uncondensed portion of the mixture leaving liquefier 8 is led directly back through that liquefier and exchanger 66, after which it is expanded and reintroduced into the system as a cooling agent, as previously described in connection with Fig. 4.

It is a feature of all embodiments of this invention that the methane recovered, either as a liquid or as a gas, has a purity of around 99 per cent, while the hydrogen recovered has a purity of at least 92 per cent. In addition, by employing an external refrigerating cycle, the hydrogen can be recovered under substantial pressure.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. The method of separating the constituents of a substantially ternary gaseous mixture containing hydrogen and methane and a constituent having an intermediate boiling point to recover the hydrogen and methane therefrom that includes the following steps: compressing the mixture, cooling the compressed mixture in at least three stages to liquefy substantially all of its constituents with the exception of hydrogen, using the resulting liquefied constituents to condense liquid reflux for rectifying said liquefied constituents, rectifying said liquefied constituents to obtain substantially pure liquid methane and a gaseous intermediate boiling constituent, expanding said gaseous constituent to substantially atmospheric pressure to lower its temperature, using the gas so expanded as a cooling agent in the first of said cooling stages, using the liquid methane to effect the second of said cooling stages to partially vaporize the liquid methane to produce vapor reflux for said rectification, and using said hydrogen as a cooling agent in all of said cooling stages except the second.

2. A method according to claim 1, in which said liquid methane is subcooled by heat exchange with said liquefied constituents, then throttled to substantially atmospheric pressure, and recovered as a liquid.

3. A method according to claim 1, in which said liquid methane is subcooled by heat exchange with said liquefied constituents, then throttled to substantially atmospheric pressure, then used as a cooling agent successively in the third and first of said cooling stages, and finally recovered as a gas.

4. A method according to claim 1, in which said hydrogen before being used as a cooling agent in any of said cooling stages of the compressed mixture is further cooled to condense therefrom residual less volatile constituents to increase the purity of the hydrogen, then expanded to an intermediate pressure with performance of external work to lower its temperature, and then used as a cooling agent to effect said further cooling.

5. A method according to claim 4 that includes the following additional steps: expanding said condensed residual constituents, and using the expanded residual constituents successively as a cooling agent in said further cooling of the hydrogen and in the first of said cooling stages of the compressed mixture.

6. A method according to claim 1 that includes the following additional step: using a cold fluid that is circulated in an external refrigeration cycle as a cooling agent in the last of said cooling stages of the compressed mixture.

7. A method according to claim 1, in which said hydrogen after being used as cooling agent in the last of said cooling stages of the compressed mixture and before it is used as a cooling agent in the first of said cooling stages is expanded to substantially atmospheric pressure with performance of external work to recool it to a lower temperature and is then reused as a cooling agent in the last of said cooling stages of the compressed mixture.

8. A method according to claim 1, in which said gaseous mixture is coke oven gas.

9. Apparatus for separating by partial condensation and rectification the constituents of a substantially ternary gaseous mixture containing hydrogen and methane and a constituent having an intermediate boiling point to recover the hydrogen and methane therefrom, said apparatus comprising a compressor for compressing the mixture, a first heat exchange means for initially cooling the mixture with the cold separated gaseous constituents, a second heat exchange means for further cooling the compressed mixture with liquid methane resulting from said rectification and for vaporizing some of the liquid methane and form vapor reflux for said rectification, at least one additional heat exchange means for still further cooling the compressed mixture to liquefy most of its constituents with the exception of hydrogen, a rectifying column for rectifying the resulting liquefied constituents into liquid methane and a gaseous intermediate boiling constituent, a condenser for condensing some of said gaseous constituent as liquid reflux for said rectification by heat exchange with the liquefied constituents before those constituents are rectified, a conduit for delivering the unliquefied hydrogen successively to said additional heat exchange means and to said first heat exchange means as a cooling agent therein, expansion means for expanding to substantially atmospheric pressure the gaseous constituent separated by rectification, and a conduit for delivering the expanded gaseous constituent to said first heat exchange means as a cooling agent therein.

10. Apparatus according to claim 9 that includes the following additional elements: a liquefier for further cooling the unliquefied hydrogen before it is used as a cooling agent for the compressed mixture to liquefy residual less volatile constituents contained in said hydrogen, expansion means for expanding the resulting purified hydrogen to an intermediate pressure with performance of external work to lower its temperature, and a conduit for conducting the expanded hydrogen to the liquefier as a cooling agent therein.

11. Apparatus according to claim 10 that includes the following additional elements: a throttle valve for expanding said liquefied residual constituents to lower their temperature and conduits for successively delivering said throttled residual constituents to the liquefier and then to said first heat exchange means as a cooling agent therein.

12. Apparatus according to claim 9 that includes the following additional element: means for passing a cold fluid that is circulated in an external refrigeration cycle through at least one of said additional heat exchange means as a cooling agent therein.

13. Apparatus according to claim 9 that includes the following additional elements: a subcooler for subcooling said liquid methane by heat exchange with said liquefied constituents before those constituents are rectified, a throttle valve for expanding the subcooled liquid methane to substantially atmospheric pressure, and a storage tank for receiving the throttled liquid.

14. Apparatus according to claim 9 that includes the following additional elements: a subcooler for subcooling said liquid methane by heat exchange with said liquefied constituents before those constituents are rectified, a throttle valve for expanding the subcooled liquid methane to substantially atmospheric pressure, and conduits for delivering the throttled methane successively to at least one of said additional heat exchange means and then to said first heat exchange means as a cooling agent therein.

15. Apparatus according to claim 14 that includes the following additional elements: expansion means for expanding to substantially atmospheric pressure with performance of external work the unliquefied hydrogen after it has been used as a cooling agent in at least one of said additional heat exchange means, and a conduit for redelivering the expanded hydrogen to the last of said additional heat exchange means as a cooling agent therein.

IRVING ROBERTS.

REFERENCES CITED

The following references are of record in the file of this patent:

UNITED STATES PATENTS

| Number | Name | Date |
|---|---|---|
| 1,429,903 | Haynes | Sept. 19, 1922 |
| 1,773,012 | Schufton | Aug. 12, 1930 |
| 1,913,805 | Hausen | June 13, 1933 |
| 2,180,715 | Messer | Nov. 21, 1939 |
| 2,409,459 | Van Nuys | Oct. 15, 1946 |